United States Patent
Lan et al.

(10) Patent No.: US 8,854,391 B2
(45) Date of Patent: Oct. 7, 2014

(54) METHOD AND SYSTEM FOR PROVIDING IMAGES OF A VIRTUAL WORLD SCENE AND METHOD AND SYSTEM FOR PROCESSING THE SAME

(75) Inventors: Dong Jun Lan, Beijing (CN); Qi Cheng Li, Beijing (CN); Jian Wang, Beijing (CN); Yi Min Wang, Shanghai (CN); Zi Yu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 13/049,998

(22) Filed: Mar. 17, 2011

(65) Prior Publication Data

US 2011/0227938 A1  Sep. 22, 2011

(30) Foreign Application Priority Data

Mar. 18, 2010 (CN) .......................... 2010 1 0129206

(51) Int. Cl.
| | |
|---|---|
| G09G 5/00 | (2006.01) |
| G06T 15/00 | (2011.01) |
| G06T 15/20 | (2011.01) |

(52) U.S. Cl.
CPC ............... G06T 15/005 (2013.01); G06T 15/20 (2013.01)
USPC ............ 345/581; 345/419; 345/629; 345/633

(58) Field of Classification Search
CPC ....... G06T 15/20; G06T 15/005; G06F 3/012; H04N 13/0011
USPC ................................. 345/581, 419, 629, 633
See application file for complete search history.

(56) References Cited

U.S. PATENT DOCUMENTS

| | | | |
|---|---|---|---|
| 7,386,799 B1 * | 6/2008 | Clanton et al. ................. | 715/758 |
| 2003/0234859 A1 | 12/2003 | Malzbender et al. | |

(Continued)

FOREIGN PATENT DOCUMENTS

| | | |
|---|---|---|
| CN | 1268701 | 10/2000 |
| EP | 1890262 A1 | 2/2008 |
| GB | 2379848 A | 3/2003 |

(Continued)

OTHER PUBLICATIONS

Hendrickson, et al., "OTOY Developing Server-Side 3D Rendering Technology," Techcrunch (Jul. 7, 2008), pp. 1-3.

(Continued)

Primary Examiner — Ke Xiao
Assistant Examiner — Weiming He
(74) Attorney, Agent, or Firm — Thomas Grzesik; Fleit Gibbons Gutman Bongini & Bianco PL

(57) ABSTRACT

A method and systems for providing and processing images of a virtual world scene. The method includes: rendering the scene of the virtual world to generate a plurality of rendering results, generating at least one image stream based on at least part of the plurality of rendering results, and sending the at least one image stream to the client. The system for providing the images includes: rendering means to generate a plurality of rendering results; image stream generation means for generating at least one image stream; and sending means for sending said at least one image stream to a client. After providing the images, the images are processed by receiving means for receiving, at a client, two image streams and merging means for merging the two image streams into a single image stream for playing.

19 Claims, 13 Drawing Sheets

(56) References Cited

U.S. PATENT DOCUMENTS

| | | | |
|---|---|---|---|
| 2007/0266412 A1* | 11/2007 | Trowbridge et al. | 725/90 |
| 2008/0098064 A1 | 4/2008 | Sherinian | |
| 2008/0309671 A1* | 12/2008 | Shuster et al. | 345/474 |
| 2009/0289945 A1 | 11/2009 | Peterfreund | |
| 2010/0259539 A1* | 10/2010 | Papanikolopoulos et al. | 345/420 |

FOREIGN PATENT DOCUMENTS

| | | | |
|---|---|---|---|
| WO | WO 9603715 A1 | 2/1996 | |
| WO | WO 2006047347 A1 | 5/1996 | |

OTHER PUBLICATIONS

Dollner, et al., "An Approach towards Semantics-Based Navigation in 3D City Models on Mobile Devices," Lecture Notes in Geoinformation and Cartography, 2007, Section IV, 357-68, DOI: 10.1007/978-3-540-36728-4_27.

Eisert et. al., "Remot Rendering of Computer Games," in Proc. Internation Conference on Signal Processing and Multimedia Applications (SIGMAP), Barcelona, Spain, Jul. 2007.

Cmolik et al., "Object Based manipulation with 3D scenes in mobile enviroments," Mobile Computing and Ambient Intelligence: The Challenge of Multimedia, Aug., 8, 2005.

Quax et al., "On the Applicability of Remote Rendering of Networked Virtual Enviroments on Mobile Devices," Systems and Networks Communications, 2006. ISNC '06 International Conference, pp. 16- 16, Dec. 26, 2006.

Lee, Sang-Yup, et al., "Toward Immersive Telecommunication: 3D Video Avatar wtih Physical Interaction," ICAT, New Zealand, Dec. 5-8, 2005.

* cited by examiner

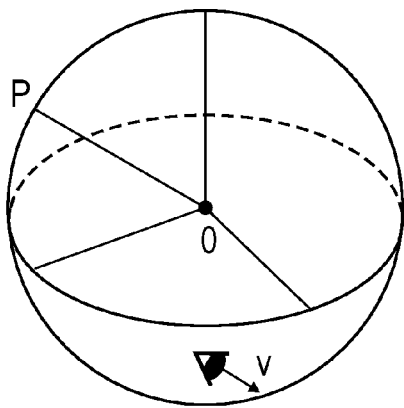
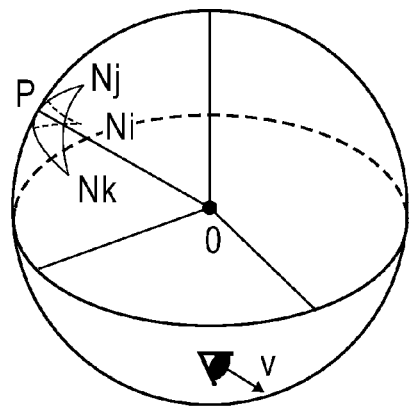
FIG. 13A　　　　　　　　FIG. 13B
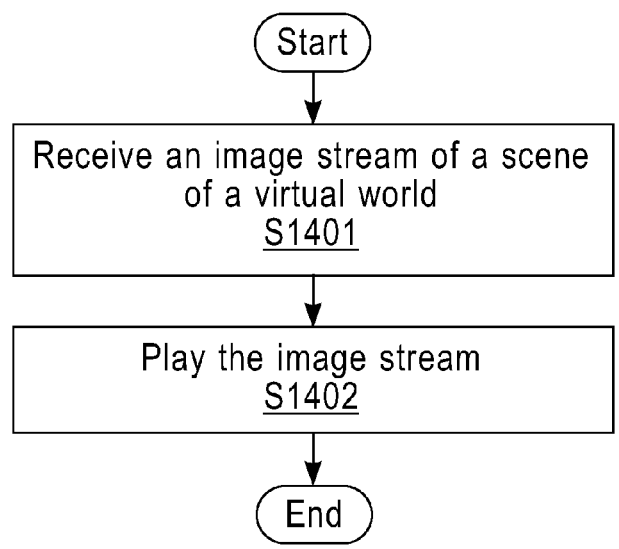
FIG. 14A

METHOD AND SYSTEM FOR PROVIDING IMAGES OF A VIRTUAL WORLD SCENE AND METHOD AND SYSTEM FOR PROCESSING THE SAME

CROSS-REFERENCE TO RELATED APPLICATION

This application claims priority under 35 U.S.C. §119 from Chinese Patent Application No. 201010129206.6 filed Mar. 18, 2010, the entire contents of which are incorporated herein by reference.

BACKGROUND OF THE INVENTION

Virtual world simulation represents one of the hottest fields in information technology. In virtual world simulation, clients receive 3D scene data associated with the virtual world from a server, and then rendering of the received data is performed locally, at the client. However, the computation required for rendering is usually overwhelming such that, for example, for a high fidelity movie image, only a few images can be rendered in a day. To remedy this problem, certain technology employs pre-rendering methods, i.e., pre-rendering shot images before actually playing them. However, unlike movie images that are pre-shot, virtual world images are generated in real time and change unpredictably, which in turn, requires the client to possess high computational power. For example, the client is required to have an auxiliary device such as a dedicated graphical processor to perform real-time rendering, which of course, greatly increases the costs of the client. Additionally, lightweight computational devices, such as laptops, which are currently very popular, command low computational power making real-time rendering in such devices extremely difficult or impossible.

SUMMARY OF THE INVENTION

One aspect of the invention includes a method for providing images of a virtual world scene. The method includes the steps of: rendering the scene of the virtual world to generate a plurality of rendering results, generating at least one image stream based on at least part of the plurality of rendering results, and sending the at least one image stream to a client.

Another aspect of the invention includes a system for providing images of a virtual world. The system includes: rendering means for rendering the virtual world to generate a plurality of rendering results, image stream generation means for generating at least one image based on the plurality of rendering results, and sending means for sending the at least one image to a client.

Another aspect of the invention includes a system for processing images of a virtual world scene. The system includes: rendering means for rendering the virtual world to generate a plurality of rendering results, image stream generation means for generating at least two images streams based on at least a part of the rendering results, sending means for sending the at least two image streams to a client, receiving means for receiving, at a client, the at least two image streams, and merging means for merging the at least two image streams into a single image stream for playing.

BRIEF DESCRIPTION OF THE DRAWINGS

The above and other features of the present invention will become more apparent by the detailed description of the embodiments with reference to the drawings. The reference signs indicate like or similar components. In the accompanying drawings, FIG. 1 schematically illustrates a block diagram of an exemplary system for implementing a virtual world according to a technical solution;

FIGS. 13A and 13B schematically illustrate a diagram of a manner for selecting a rendering result suitable for an avatar according to an embodiment of the present invention;

FIG. 14A schematically illustrates a flow chart of a method for displaying a virtual world scene according to an embodiment of the present invention;

DETAILED DESCRIPTION OF EMBODIMENTS

Figure 1:
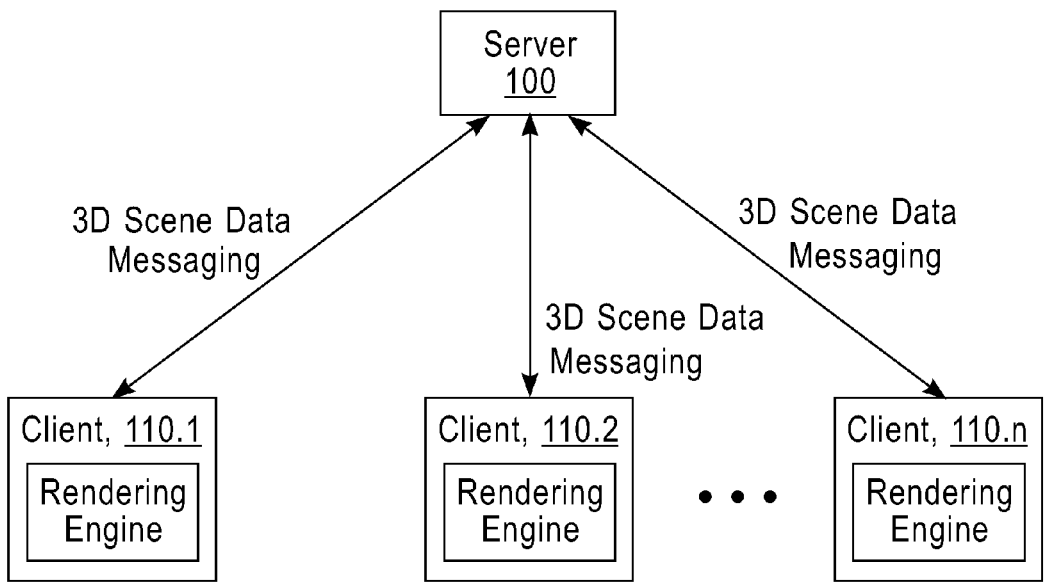

In various embodiments of the present invention, rendering is performed on a virtual world scene at a server, and only an image stream related to a client's corresponding avatar is transmitted to the client; therefore, the client's computational and/or support requirement is lowered. In some embodiments, rendering is performed on the scene of the virtual world scene from some fixed observation angles, and corresponding image streams are generated for sending to the client based only on the rendering results of the one or more fixed observation angles that approximate the observation angle associated with the client's corresponding avatar. At the client, one or more received image streams are merged and formed into a single stream for playing. Therefore, with respect to an uncertain number of clients, different avatars, and observation angles, embodiments of the present invention improve the performance and scalability of the server, provide a possibility to implement information sharing among different clients, and enable the use of peer to peer technology.

With the embodiments of the present invention, real-time rendering can be performed at a server, while the client only needs to receive image streams generated by the at least part of rendering results for playing. Therefore, through various embodiments of the present invention, the workload for rendering shifts from a client, which may have weak computational power and/or support capability, to a server, such that the client of the virtual world does not need to install a dedicated device, such as, a graphical processor. Hence, it becomes possible to provide a virtual world service for the lightweight client.

Further, with some embodiments of the present invention, rendering can be performed for a plurality of fixed observation angles at the server, and a rendering result adapted to a corresponding avatar is selected from the rendering results to generate image streams to be sent to the client. Therefore, as stated, the amount of computation required for performing the rendering by the server is irrelevant to the number of clients; this improves the performance and scalability of the server, enables real-time information share among different terminals, and provides the possibility to utilize a peer to peer technology. It is particularly advantageous when the number of clients connected to the server is uncertain or very large.

Hereinafter, a method and systems according to the present invention will be described in detail through preferred embodiments with reference to the drawings. The flowcharts and block diagrams in the drawings illustrate the system, methods, architecture, functions, and operations that can be implemented by a computer program product according to the embodiments of the present invention. In this regard, each block in the flowcharts or block diagrams can represent a module, a program segment, or a part of code, which contains one or more executable instructions for performing specified logic functions. It should also be noted that in some alternative implementations, functions indicated in blocks can occur in an order different from the order illustrated in the figures. For example, two blocks illustrated consecutively can be performed, substantially, in parallel, or, sometimes, they can be performed in an inverse order, which depends on relevant functions. It should also be noted that each block in the block diagrams and/or flow charts, or a combination of such blocks, can be implemented by a dedicated hardware-based system capable of performing specified functions or operations, or by a combination of the dedicated hardware and computer instructions.

FIG. 1 schematically illustrates a block diagram of an exemplary system for implementing a virtual world according to a technical solution. As illustrated in FIG. 1, the system includes a server 100, client 110.1, client 110.2 . . . , and client 110.n, where information is transferred, and interaction occurs, between respective clients and the server, and where the virtual world server 100, responsive to the status of an avatar corresponding to each client, transfers corresponding 3D scene data to the client or clients. Each client includes a rendering engine for rendering the 3D scene data received at the clients, including processing matters such as the transmission effect, occlusion relation, near-far relation, light, window clipping, etc. The rendering results obtained by rendering are stored in a frame buffer for displaying on a client display.

Figure 2:
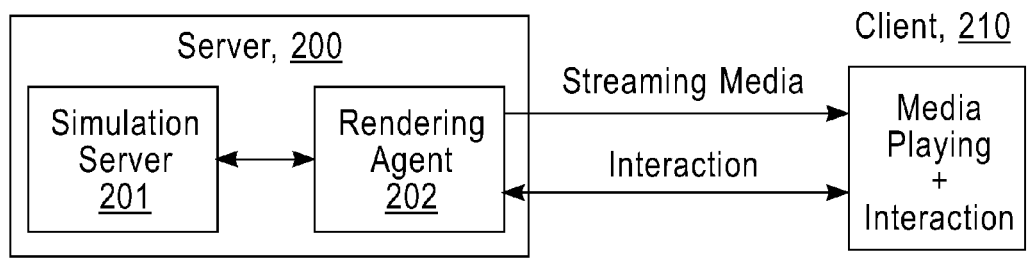
FIG. 2 schematically illustrates a block diagram of a system for implementing a virtual world according to an embodiment of the present invention.

FIG. 2 schematically illustrates a block diagram of a system for implementing a virtual world according to an embodiment of the present invention. As illustrated in FIG. 2, the server 200 includes a simulation server 201 and a rendering agent 202. The simulation server 201 receives a message from the rendering agent 202 and sends proper 3D scene data to the rendering agent 202. The rendering agent 202 performs the rendering to generate rendering results based on the 3D scene data from the simulation server 201. The rendering agent, from the rendering results, generates a streaming media suitable for the client's corresponding avatar and the streaming media is sent to the client 210. The client 210 interacts with the server 200 in a manner that permits the transfer of data and commands between the client 210 and the server 200. The rendering agent sends the client streaming media that the client can play, thereby displaying, at the client 210, a scene image as perceived by the client's corresponding avatar in the virtual world. It should be noted that in practical application, the server 200 can be implemented as a single server, a plurality of servers, or it can be in the form of a server cluster. Further, the rendering agent 202 can be implemented on a same server with the simulation server 201, on a different server from the simulation server 201, or even on a different server operated by a third party. Additionally, the rendering agent 202 can also be implemented by an individual entity communicable with the server 200, i.e., implemented by a server, a plurality of servers, or a server cluster.

Figure 3:
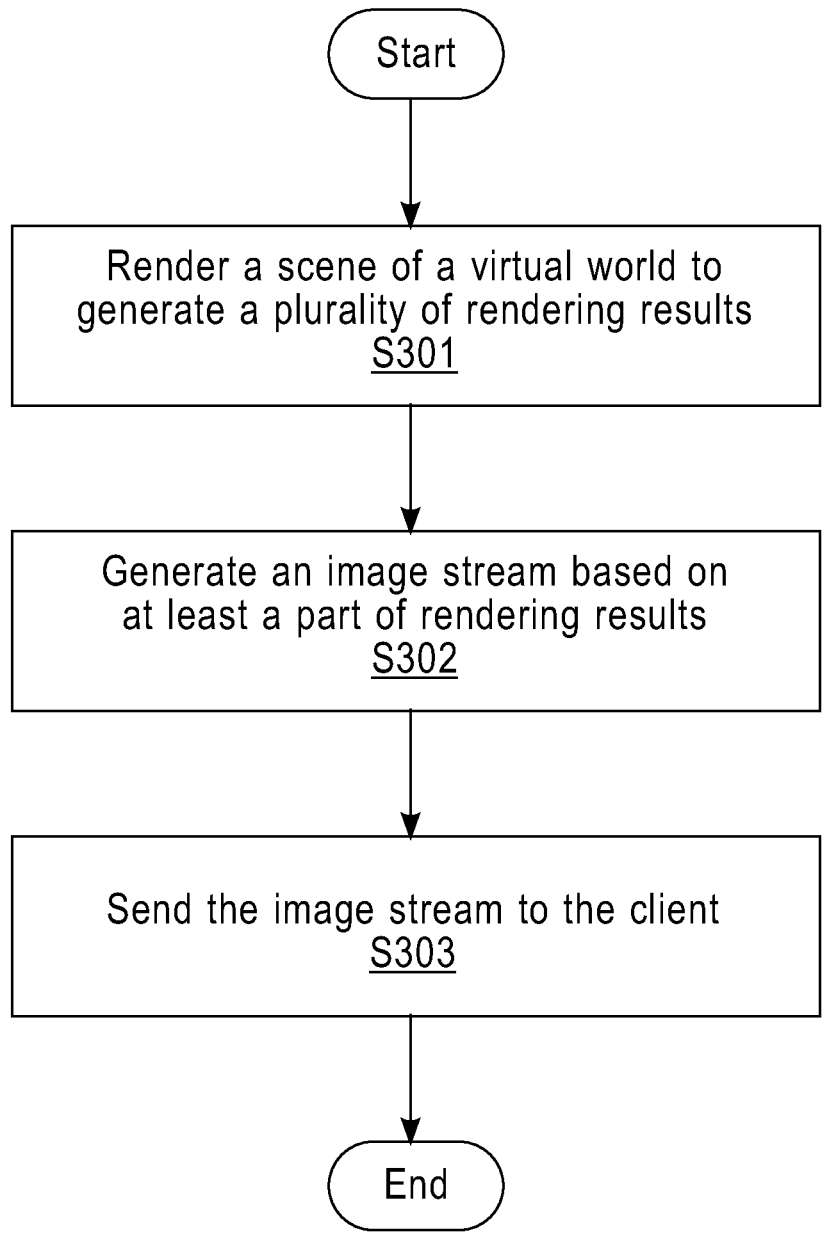
FIG. 3 schematically illustrates a flow chart of a method for providing an image of a virtual world scene according to an embodiment of the present invention.

FIG. 3 schematically illustrates a flow chart of a method for providing images of a virtual world scene according to an embodiment of the present invention. As illustrated in FIG. 3, at the first step S301, the virtual world scene is rendered to generate a plurality of rendering results. In an embodiment of the present invention, real-time rendering is performed, thereon, at the server, and from the location and observation angle of each avatar, thereby obtaining a rendering result corresponding to each avatar.

In another embodiment of the present invention, rendering can be performed at the server from at least one fixed observation angle, thereby obtaining a rendering result corresponding to each fixed observation angle. In another embodiment, rendering can be performed for different projection depths from each fixed observation angle.

Next, the flow proceeds to step S302. At step S302, an image stream is generated based on at least a part of the rendering results. In an embodiment of the present invention, rendering results corresponding to the client's avatar are converted into a streaming media. The latter occurs among the plurality of rendering results obtained by rendering each avatar.

In another embodiment of the present invention, it is possible to convert a part of the rendering results adapted to the observation angles (or orientations) of the client's corresponding avatar, among a plurality of rendering results formed from fixed observation angles, into a streaming media. In another embodiment, another part of the rendering results adapted to the observation angles and locations of the corresponding avatar is converted into a streaming media.

Then, at step S303, an image stream, such as the streaming media, is sent to the client. In an embodiment of the present invention, as long as a player suitable for playing this image stream is installed at the client, an image stream, such as streaming media, can be played at the client.

In another embodiment of the present invention, at least two image streams are sent to the client, and these two images merge at the client to form a single image stream for playing. With regard to various embodiments as depicted with reference to FIG. 3, more detailed depiction will be presented hereinafter by referring to FIGS. 4 to 13, respectively.

Figure 4:
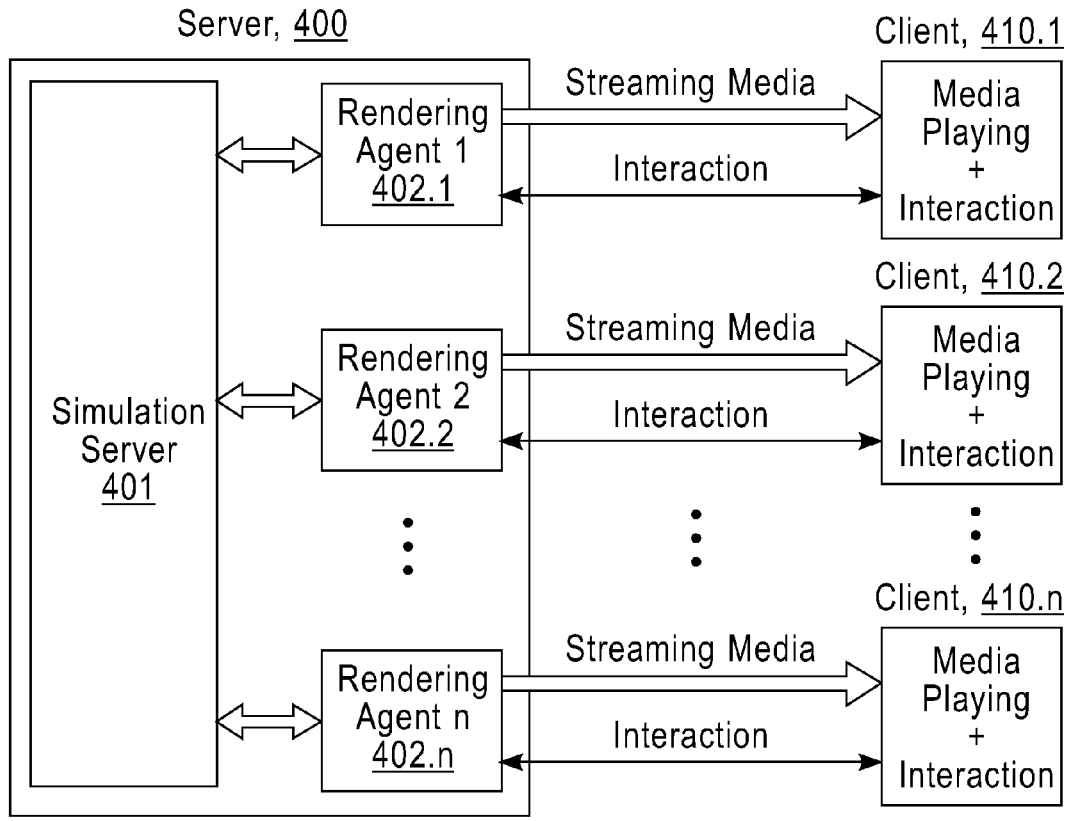
FIG. 4 schematically illustrates a block diagram of a system for implementing a virtual world according to another embodiment of the present invention.

FIG. 4 schematically illustrates a block diagram of a system of implementing a virtual world according to another embodiment of the present invention. As illustrated in FIG. 4, at a server 400, corresponding rendering agents 402.1, 402.2, . . . , and 402.n are arranged for respective clients 410.1, 410.2, . . . , and 410.n connected to the virtual world server. Each rendering agent 402.1, 402.2, . . . , and 402.n performs the rendering for the corresponding scene from locations and observation angles of the client's corresponding avatar in the virtual world, thereby generating rendering results suitable for the corresponding avatar. The operations of rendering will be illustrated with reference to FIG. 5.

Figure 5:
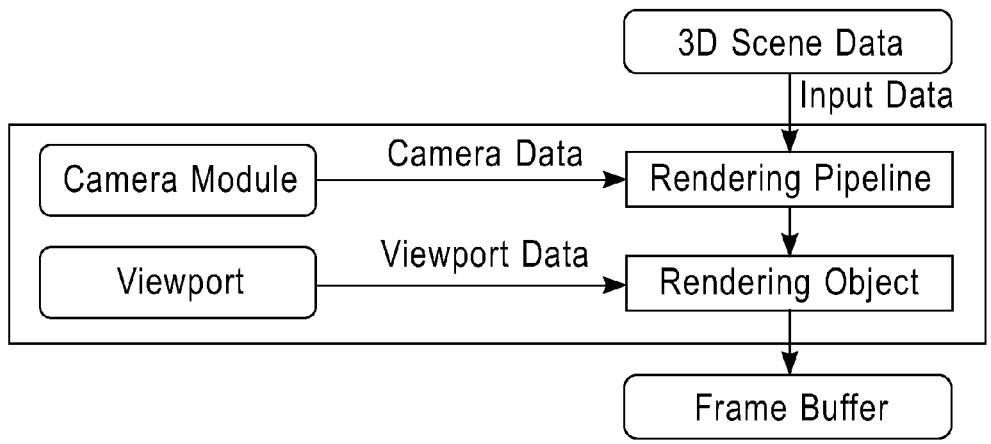
FIG. 5 schematically illustrates a block diagram of an exemplary structure of a rendering engine for performing rendering.

FIG. 5 schematically illustrates a block diagram of an exemplary structure of a rendering engine capable of performing rendering. In an embodiment, the rendering engine illustrated in FIG. 5 is part of each rendering agent 402.1, 402.2, . . . , and 402.n, as illustrated in FIG. 4. As illustrated in FIG. 5, a rendering pipeline assembly converts the input 3D scene data into a proper two dimensional (2D) model data based on camera data (including the location and observation angle of a camera module in the rendering engine). Then, a rendering object assembly clips generated 2D model data according to view port data (window or clipping window) of the corresponding avatar, and projects it onto a predetermined view port. The rendering result obtained from the rendering, as a frame buffer, is stored in a frame buffer memory.

In another embodiment, each rendering agent 402.1, 402.2, . . . , and 402.n further includes a means, circuit,etc., for converting a part of rendering results generated by the rendering engine as illustrated in FIG. 5 into an image stream suitable for playing at the corresponding client. The image stream, for example, can be a currently popular streaming media format, such as a moving picture experts group 4 (MPEG-4), H.264, and the like. The technology of converting the rendering results into an image stream is known in the art, which will not be detailed here. Afterwards, the rendering agents 402.1, 402.2, . . . , and 402.n send the converted image stream to the corresponding clients 410.1, 410.2, . . . , and 410.n to play.

From the above description, it can be seen that, based on the embodiment as illustrated in FIG. 4, the workload for rendering shifts from a client possessing weak computational capability and/or power capability to rendering agents, such that a common client does not need to have a dedicated device such as a graphical processor. This makes it possible to provide a virtual world service to lightweight clients, such as a mobile communication terminal and a portable computer.

However, it should be noted, that in actual application, the number of clients 410 connected to the server 400 can be considerably large and uncertain. In this case, the present invention provides other embodiments. Hereinafter, depiction will be presented with reference to FIGS. 6 to 13.

Figure 6:
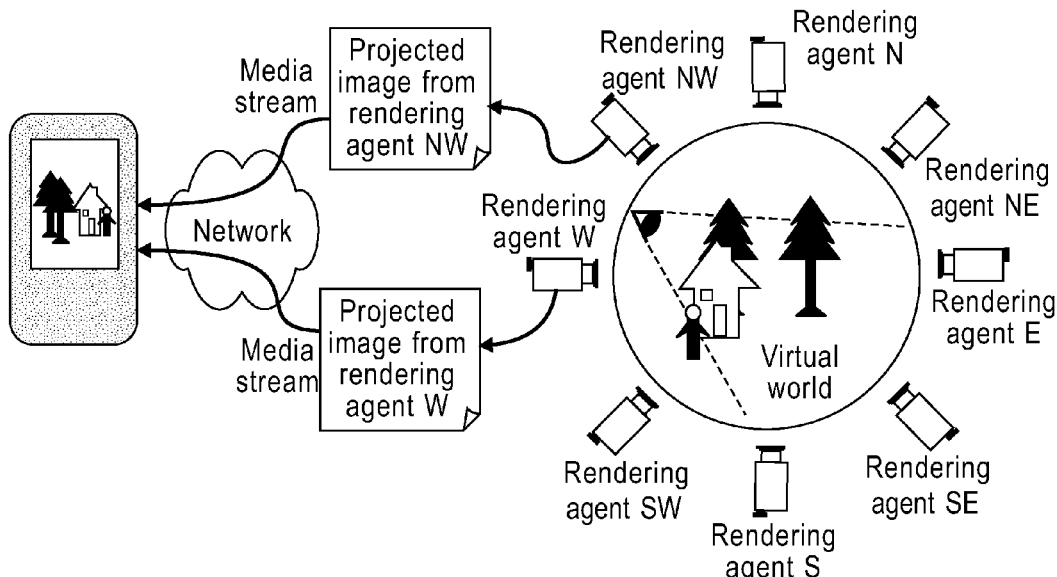
FIG. 6 schematically illustrates a diagram of another embodiment of the present invention.

FIG. 6 schematically illustrates a diagram for another embodiment of the present invention. According to the embodiment, in a 3D virtual world, rendering is performed for the virtual world scene from at least one fixed observation angle, so as to generate a plurality of rendering results. As illustrated in FIG. 6, rendering agents at a plurality of fixed observation angles are arranged in a peripheral space of the virtual world, for example eight rendering agents marked as W(west), NW(northwest), N(north), NE(northeast), E(east), SE(southeast), S(south), and SW(southwest). These eight rendering agents are evenly provided on a circular periphery of the peripheral space with their corresponding observation angles facing toward the inside of the scene. Based on the observation angles of the client's corresponding avatar, the projection images obtained through rendering, by e.g. two proper rendering agents, are provided to the client in streaming media form. For the client's corresponding avatar, as illustrated in FIG. 6, the proper rendering agents can, for example, be a rendering agent NW and a rendering agent W.

In another embodiment based on FIG. 6 and the above description, other manners can be adopted to select a proper fixed observation angle and a corresponding rendering agent. Hereinafter, the detailed description is presented for another embodiment for selecting a proper fixed observation angle and a corresponding rendering agent with reference to FIG. 13.

In another embodiment based on FIG. 6 and the above description, other manners can be adopted to select a proper fixed observation angle and a corresponding rendering agent. Hereinafter, the detailed description is presented to another embodiment for selecting a proper fixed observation angle and a corresponding rendering agent with reference to FIG. 13.

In another embodiment, as illustrated in FIG. 6, two image streams are merged into a single image stream at the client so as to display it on the client.

Figure 7:
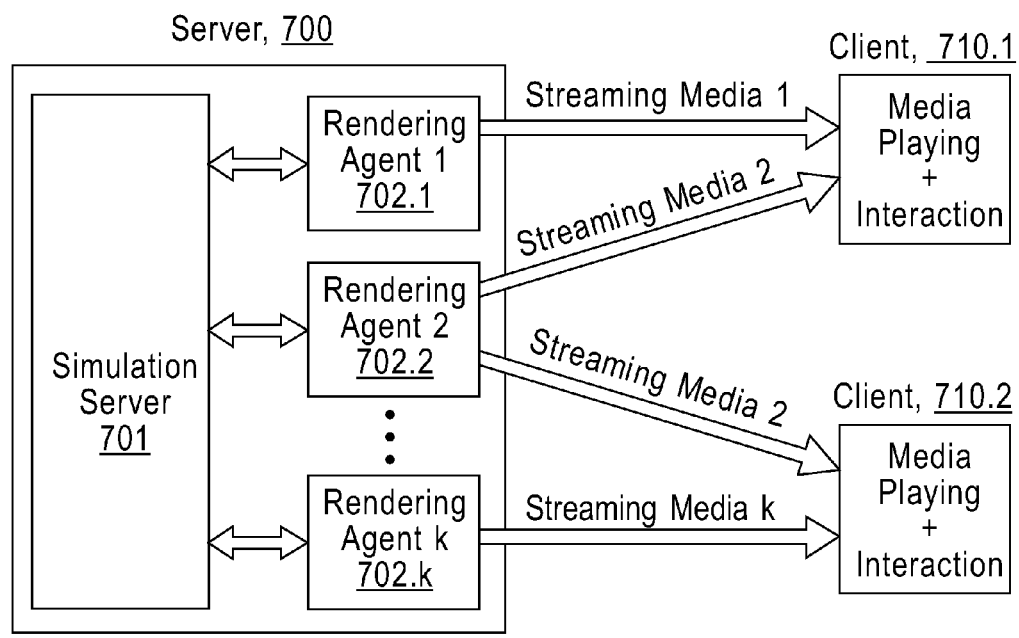
FIG. 7 schematically illustrates a block diagram of a system for implementing a virtual world according to another embodiment of the present invention.

FIG. 7 schematically illustrates a block diagram of a system of implementing a virtual world according to the embodiment of the present invention. As illustrated in FIG. 7, the server 700 includes a simulation server 701 and a k number of rendering agents 702.1, 702.2, . . . , 702.k, where k is an integer greater or equal to 1. The k rendering agents correspond to the fixed observation angles at k different locations, and are used for rendering from corresponding fixed observation angles. For each client, at least two rendering agents adapted to the corresponding avatar are selected based on the observation angles of the avatar. Further, the part of rendering results adapted to the corresponding avatar among the rendering results obtained through rendering by the selected rendering agents is converted into a streaming media for sending to the corresponding clients 710.1 or 710.2. As further illustrated in FIG. 7, the streaming media 1 and streaming media 2 obtained by the rendering agent 702.1 and rendering agent 702.2, respectively, are sent to the client 710.1. The streaming media 2 and the streaming media k, obtained by the rendering agents 702.2 and 702.k, are sent to the client 710.2.

According to another embodiment, the number of rendering agents set at the server 700 can be fixed without sustaining negative effect due to the number of connected clients because the load of the server 700 does not depend on the number of avatars which enter the virtual world. Thus the performance of the server is improved, and the server has a better scalability. Additionally, the rendering result or results generated by respective rendering agents 702.1, 702.2, . . . , 702.k can be shared by a plurality of clients, thereby saving resources. Additionally, it is also possible to implement a peer to peer technology in a virtual world system.

Figure 8:
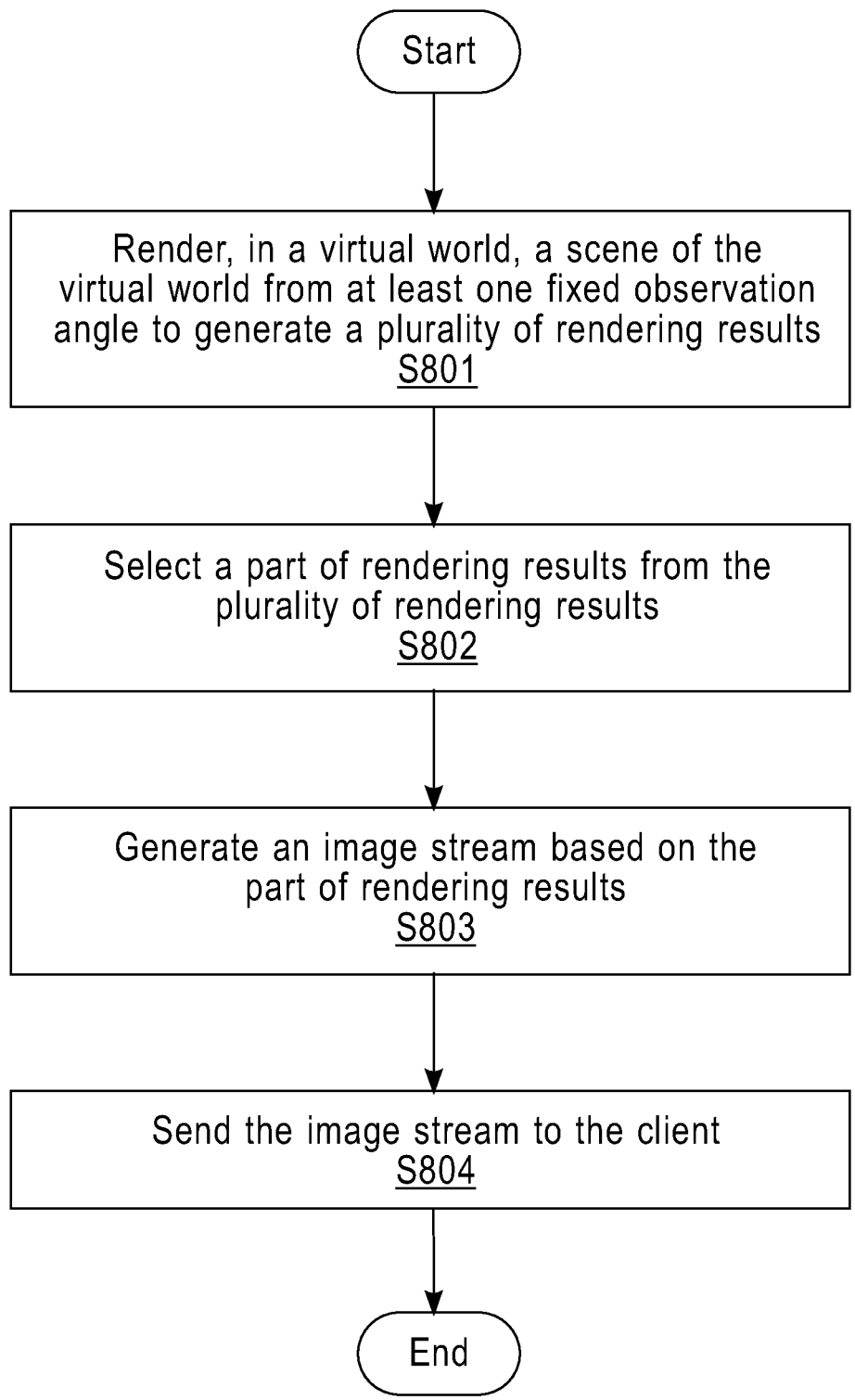
FIG. 8 schematically illustrates a flow chart of a method for providing an image of a virtual world scene according to another embodiment of the present invention.

FIG. 8 schematically illustrates a flow chart of a method for providing an image of the virtual world scene according to another embodiment of the present invention. As illustrated in FIG. 8, first, at step S801, in a virtual world, rendering is performed for the virtual world scene from a plurality of fixed observation angles, so as to generate a plurality of rendering results. In this embodiment, a plurality of fixed observation angles is set in the virtual world, and arranged such that the plurality of fixed observation angles is pre-set to face toward the scene from a plurality of points distributed in the peripheral space of the scene. An example of presetting the plurality of fixed observation angles is illustrated in the FIG. 6. As illustrated in FIG. 6, a west location, a northwest location, a north location, a northeast location, an east location, a southeast location, a south location, and a southwest location in the scene of a virtual world, respectively, set a fixed observation angle facing towards the inside of the scene (preferably towards the center of the scene). Those skilled in the art can appreciate, based on the content of this description, that it is possible to conceive setting a larger number of fixed observation angles from more spatial locations (planar or stereoscopic) by further subdividing. The manner of setting a fixed observation angle on a circular periphery in a peripheral space of the virtual world, as illustrated in FIG. 6, is feasible for some simple applications, but for complex applications, another setting manner may be required.

Figure 9A:
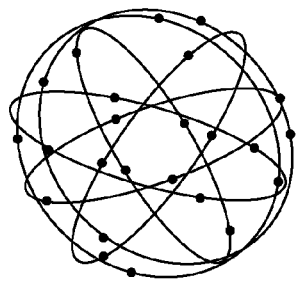
FIGS. 9A and 9B schematically illustrate a diagram of manner for pre-setting a fixed observation angle according to two different embodiments of the present invention.
Figure 9B:
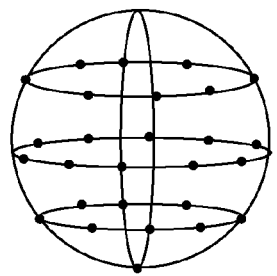

FIGS. 9A and 9B illustrate two examples of presetting a plurality of fixed observation angles in a fashion more suitable for a complex application. As illustrated in FIG. 9A, the peripheral space of the virtual world can be a peripheral spherical space enclosing the scene space, and six concentric circles whose centers coincide with the spherical center of the peripheral spherical space. The spherical circles are located in different planes, and can be found on the peripheral spherical space. On the circumference of each circle, for example, four fixed observation angles facing toward the inside of the scene (preferably facing toward the center of the scene) are provided, such that the 24 observation angles are substantially evenly distributed on the peripheral space. As illustrated in FIG. 9B, the virtual world scene is also enclosed by a peripheral spherical space. On this peripheral spherical space, it is possible to find three concentric circles whose centers coincide with the spherical center of the peripheral spherical space. These circles, two of which are located symmetrically at two sides of one of the circles which are parallel thereto, are located in mutually perpendicular planes. Also, fixed observation angles, facing toward the inside of the scene, are arranged on the circumferences of the five circles, such that all fixed observation angles are substantially evenly distributed on the peripheral space.

It should be noted that FIGS. 6, 9A and 9B only illustrate examples of pre-setting a plurality of fixed observation angles, but should not be construed as a limitation to the present invention. On the contrary, those skilled in the art can conceive of a plurality of other embodiments for setting a fixed observation angle based on these exemplary depictions of this invention.

It should be further noted that the number of fixed observation angles as set can be determined based on the practical application. Generally, to better approximate the observation angle associated with the avatar, it is best to increase the number of set fixed observation angles. This enhances the image scene provided to the client by making the video stream image complete and realer. However, as the number of fixed observation angles, as set, increases, the computation amount borne by the server increases, and more the computational resource is occupied. Thus, the number of fixed observation angles can be reasonably selected based on the actual system requirements, employing a suitable compromise between the amount of computation required for real-time rendering and the quality of the scene image. In addition, it is advantageous to set the fixed observation angles such that they are distributed as evenly as possible on the external space of the scene, which can better guarantee that the quality of the image remains consistent.

In another embodiment, by step S801, rendering can be performed from each fixed observation angle, and a rendering result for each fixed observation angle can be obtained. Further, those skilled in the art should be able to further appreciate that that the avatar, in a scene, can be in a location, corresponding to different scene depths; thus even at a same observation angle, the scene images of the same avatar perceived at different scene depths can also be different. To this end, in a further embodiment of the present invention, for each fixed observation angle, rendering is further performed for a virtual world scene at different projection depths. Hereinafter, rendering based on the projection depth will be depicted in detail with reference to FIGS. 10 to 12.

Further, with reference to FIG. 8, the flow proceeds to step S802. At step S802, a part of rendering results are selected from the plurality of rendering results. Hereinafter, an example of selecting a part of rendering results will be depicted in detail with reference to FIG. 13.

Next, the flow proceeds to step S803. At step S803, an image stream is generated based on the part of rendering results. In an embodiment, two groups of rendering results corresponding to two fixed observation angles are selected. Each selected group of rendering results can be clipped first such that each group of rendering results is more suitable for the avatar. Clipping can be executed based on one or more of the viewport, location of the avatar, and the observation angle of the avatar. Afterwards, two streaming media in, for example, MPG4 or H.264 format, can be generated based on each group of rendering results obtained from clipping.

Then, at step S804, the generated streaming media is sent to the client. The sent media stream will be processed (for example, being converted and merged, which will be depicted in detail hereinafter) and displayed at the client.

In various embodiments, as previously mentioned, at least one fixed observation angle that best approximates a client's corresponding avatar can be selected from a plurality of fixed observation angles that have been set, so as to take rendering results generated from the at least one fixed observation angle as the part of rendering results, for generating an image stream for the client.

Figure 10:
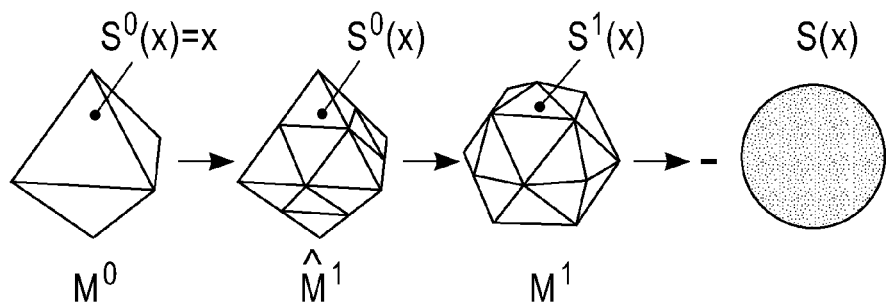
FIG. 10 schematically illustrates a physical mesh model that is usable in this invention.

FIG. 10 schematically illustrates a physical grid model usable in the embodiments of this invention, where the physical grid model is made of a triangle group (TG). The triangle group is a combination of an object's mutually adjacent visible triangular facets. The direction of the triangular facet can be defined as a normal direction of the triangular facet. Therefore, if the angle between the direction of a triangular facet and the view direction of the avatar, or camera module (for example, a fixed observation angle as previously mentioned), is less than $\pi/2$, then it is deemed that this triangular facet is visible. The triangular group has a correlation with the camera module, i.e., for a camera module in a different fixed observation angle, its triangular group is different. FIG. 10 illustrates grid models M0, $\tilde{M}^1$, and M1, etc., which represent spheres with different subdivision degrees. In another embodiment, a triangular group can have attributes such as the identification (ID) of TG, an ID of the object to which the TG belongs, an ID of relevant camera module, the maximum depth and minimum depth of the triangular group, and among other things as well. It should be noted that a triangle group is only an example for a physical grid model, and in fact, a polygonal group such as a quadrangle group can be used in various embodiments of the present invention.

Figure 11A:
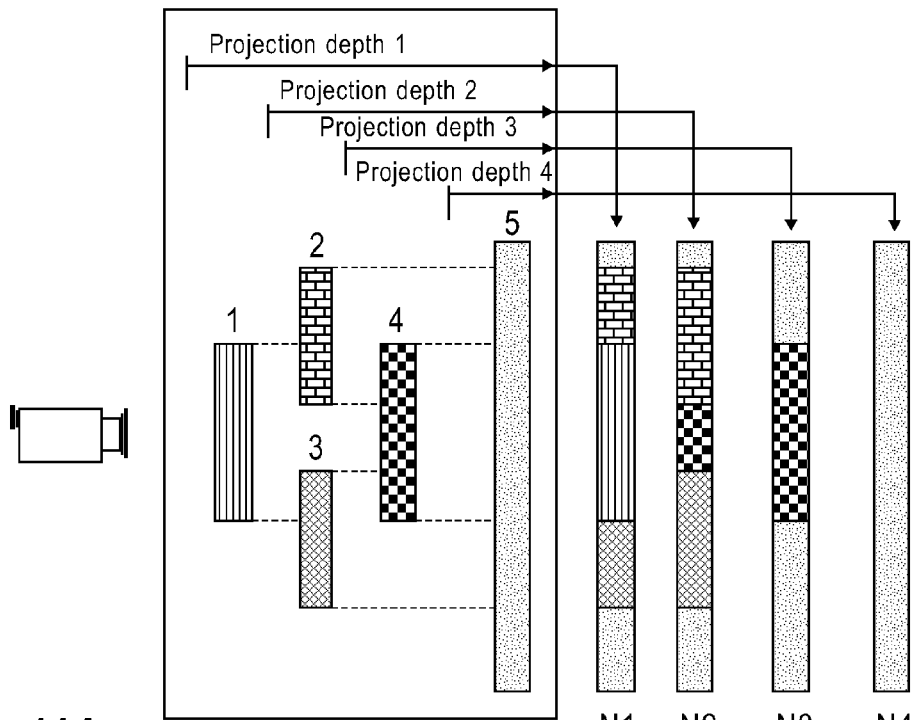
FIGS. 11A and 11B schematically illustrate a diagram for rendering according to two different embodiments of the present invention.

FIG. 11A schematically illustrates a diagram of rendering according to a further embodiment of the present invention. In this embodiment, rendering is performed to the scene at different projection depths, so as to obtain projection results corresponding to different projection depths. As illustrated in FIG. 11A, an exemplary scene corresponding to the camera module N includes objects 1 to 5 with mutually different patterns, where object 1, object 2, object 4 and object 5, in sequence, are increasingly farther from a camera module N located in the virtual world. Also, object 2 and object 3 have the same distance from the camera module. As illustrated in FIG. 11A, in order to render based on different projection depths, the projection depth at which rendering is performed can be determined first.

In another embodiment, the projection depth is selected such that rendering can be performed to a scene in manner that includes all possible object combinations, while minimizing the number of projection depths. For the scene, as illustrated in FIG. 11A, projection depth I to projection depth 4 are selected. Therefore, rendering can be performed at projection depths in a fashion that permits obtaining four different rendering results corresponding to the image N1 to the image N4 (which, again, is illustrated in FIG. 11A).

Figure 11B:
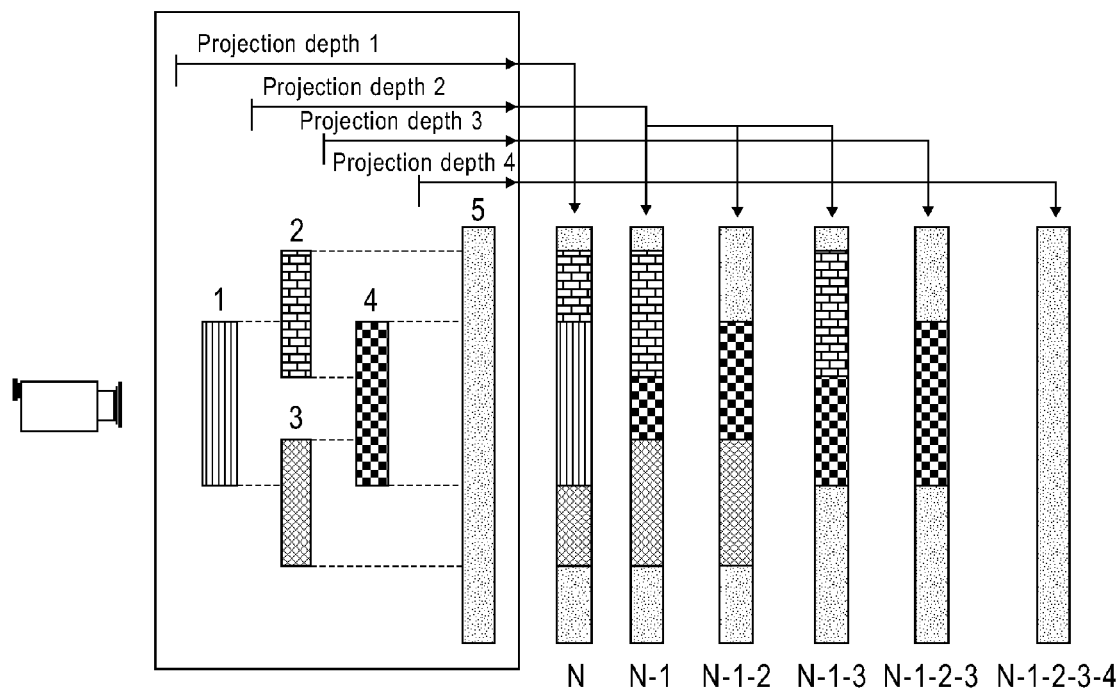

FIG. 11B schematically illustrates a diagram of rendering according to a further embodiment of the present invention. In this embodiment, what is different from FIG. 11A is that in the case involving a plurality of objects at the same scene depth, rendering is further performed by removing the plurality of objects progressively. In other words, as illustrated in FIG. 11B, for each fixed observation angle, rendering is performed by removing each object progressively from the scene based on the projection depths, so as to obtain a plurality of rendering results including different object combinations in the scene. As further illustrated in FIG. 11B, rendering results corresponding to the image N, N-1, N-1-2, N-1-3, N-1-2-3, and N-1-2-3-4, respectively, are obtained, where the image N (corresponding to the image N1 in FIG. 11A) is an image including all objects, the image N-1 (corresponding to the image N2 in FIG. 11A) is an image with the object 1 removed, and the image N-1-2 is an image with object 1 and object 2 removed, and so forth. The comparison between FIG. 11A and FIG. 11B illustrates that, besides the rendering results corresponding to those in FIG. 11A, FIG. 11B, the embodiment further includes rendering results corresponding to the image N-1-2 with objects 1 and 2 removed, and the image N-1-3 with objects 1 and 3 removed. The obtained rendering results can be stored in a proper manner.

Figure 12:
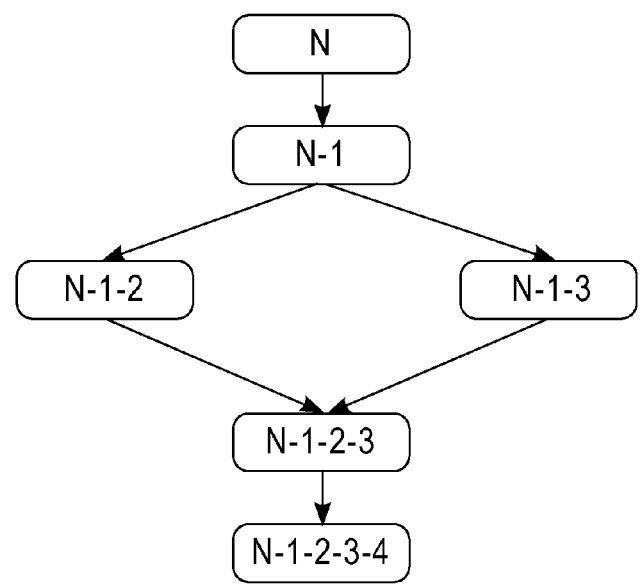
FIG. 12 schematically illustrates a diagram of a triangle group relation network (TGRN) according to an embodiment of the present invention.

FIG. 12 schematically illustrates a diagram of a triangle group relation network (TGRN) according to an embodiment of the present invention. In the embodiment, for each rendering agent, (or for each camera module), the results obtained from rendering are stored with a TGRN structure as illustrated in FIG. 12. The triangular group network as illustrated in FIG. 12 is a directional network including rendering nodes, where the rendering nodes are related to the rendering results, and directional connection lines between the rendering nodes indicate the relationships between rendering results.

In another embodiment of the present invention (for example FIG. 11A), the rendering nodes are related to the rendering results of different projection depths, and directional connecting lines indicate the depth relationships of projection depths. For example, the projection depths of the rendering results associated with the parent nodes are greater than the projection depths of the rendering results associated with the children nodes. In a further embodiment of the present invention, (for example FIG. 11B), the rendering nodes are associated with the rendering results, including different object combinations in the scene, and the directional connection lines indicate the relationships between the object combinations involved with the rendering results. For example, the objects as included in the rendering results associated with parent nodes are a sub set of objects included in the rendering results associated with the child nodes, or vice versa. Each rendering node can include attributes such as node code, projection depth, relevant rendering result, a reference to the rendering result, IDs of all triangular facets relevant to the rendering node, and of the objects relevant to the rendering result. Respective rendering results stored in the TGRN, triangular facet group, and relevant object, are updated in real time with the change of scene and/or movement of the avatar. It should be noted that the TGRN network as illustrated in FIG. 12 is only exemplary. For a scene with a considerable number of objects and complex relationships, this TGRN network can become much more complex.

In another embodiment of the present invention, in the case that a rendering result has been generated, when rendering is performed based on another projection depth, rendering can be performed for the scene change part at different projection depths, such that a changed rendering result is obtained and stored into corresponding rendering nodes. This embodiment has the advantage of prominently reducing the amount of computation for rendering, and for reducing the storage required for the rendering results, thereby saving the computational resources and storage resources of the system.

FIG. 13 illustrates a method for determining a fixed observation angle suitable for the avatar according to an embodiment of the present invention. As illustrated in FIG. 13A, firstly, a vector V representing the observation angle of an avatar is determined in the scene. Then, a point P is found on a peripheral space surface of the scene, such that the vector pointing to the scene center O from the point P is parallel to the vector V representing the observation angle of the avatar. Next, and for example, three fixed observation angles Ni, Nj, and Nk can be selected from all fixed observation angles arranged in the peripheral space of the scene, such that the point P is located on a spherical triangle formed by the points where the three fixed observation angles are located, and the spherical triangle has the minimum area among all spherical triangles meeting the conditions. In this way, three fixed observation angles suitable for the avatar can be selected. Additionally, in the case requiring the selection of two fixed observation angles, two observation angles can be selected from the three determined fixed observation angles. Thereby, the rendering results generated from the selected at least two observation angles is taken as the part of rendering results for forming the streaming media.

It should be noted that FIG. 13A and FIG. 13B only provide examples of the present invention, and based on the teaching of the present invention, the skilled in the art can envisage a plurality of different embodiments for selecting proper fixed observation angles. For example, it is possible to find at least two fixed observation angles closest to the point P, or at least two fixed observation angles with a minimum vector angle with respect to the vector directing to point O from point P.

Additionally, in a further embodiment of the present invention, four or more fixed observation angles can be determined from all fixed observation angles arranged in a peripheral space in the scene.

It should be noted that if there exists a fixed observation angle completely identical to the observation angle of the avatar, it is possible to only select this fixed observation angle such that the amount of data sent to the client is as small as possible.

Furthermore, in an embodiment where a plurality of rendering results is further generated for each fixed observation angle at different projection depths, a rendering result suitable for the avatar can be selected from a plurality of rendering results corresponding to each selected fixed observation angle.

In another embodiment, a rendering result with a projection depth suitable for the location of the avatar is selected.

In another embodiment, a rendering result including an object combination visible to the avatar is selected. According to the embodiment, the objects visible to the avatar can be determined based on the location of the avatar, and then a rendering result that exactly includes all objects visible to the avatar is found among the rendering results based on different depths. In a further embodiment, a rendering result not including the objects invisible to the avatar is selected. According to this embodiment, the objects invisible to the avatar can be determined first based on the location of the avatar, and then a rendering result that exactly removes the invisible object is selected from the rendering results.

In another embodiment, the naming of a node code is based on a camera module serial number, and an ID of objects not included in the rendering result. For example, as illustrated in FIG. 12, a rendering result's node code that includes all objects is named N, while the node codes of the rendering nodes removing object 1, objects 1 and 2, objects 1 and 3, objects 1, 2, and 3, and objects 1, 2, 3, and 4, respectively, are named as N-1, N-1-2, N-1-3, N-1-2-3, and N-1-2-3-4. According to this embodiment, the camera module's serial number suitable for the avatar can be determined first, and then, the serial numbers associated with objects invisible to the avatar is determined. Next, a rendering node whose code number exactly includes the determined serial number can be found from the rendering results so as to select the part of rendering results for forming an image stream.

In the embodiment where what is stored in the rendering node is a changed rendering result, preceding nodes or successive nodes with respect to the selected node is further required to be selected so as to obtain a complete rendering result corresponding to the image of a complete scene.

FIG. 14A illustrates a flow chart for displaying an image stream for a virtual world according to an embodiment of the present invention. As illustrated in FIG. 14A, first at step S1401, the server receives an image stream for a virtual world scene. Then, this image stream is played at step S1402. As previously mentioned, the image stream can be MPEG-4 or H.264 format; thus any media player, as long as it is compatible with any one or two of the two formats, can be used for playing the scene's image stream.

Figure 14B:
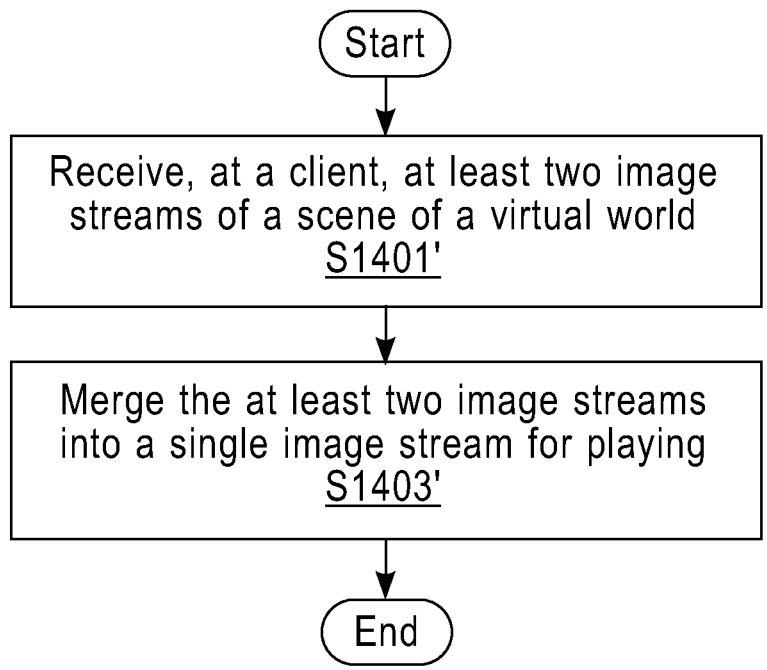
FIG. 14B illustrates a flow chart of a method for processing an image of a virtual world scene according to an embodiment of the present invention.

FIG. 14B illustrates a flow chart for processing an image stream of a virtual world according to another embodiment of the present invention. In this embodiment, at least two image streams of the virtual world scene are received at the client at step S1401', and at step S1403', the at least two image streams are merged into a single image stream for playing (as depicted hereinafter with reference to FIG. 15). The above at least two image streams are generated in the virtual world based on a plurality of rendering results obtained by rendering the scene of the virtual world from at least one fixed observation angle. In a still further embodiment of the present invention, a merged single image stream can be further played.

Figure 15:
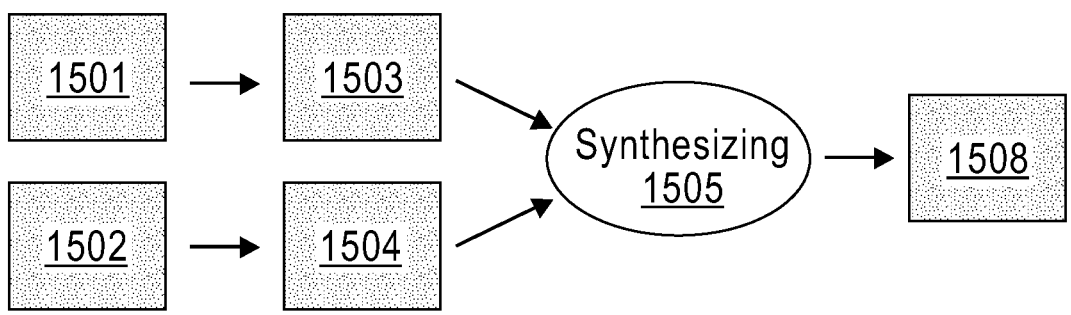
FIG. 15 schematically illustrates a diagram of combining image frames according to an embodiment of the present invention.

FIG. 15 schematically illustrates a diagram of combining image frames according to an embodiment of the present invention. Two image frames 1501 and 1502, which are synchronized in time, are illustrated in the figure, where they are respectively from the received two image streams. It can be understood that the image streams received from the server correspond to the fixed observation angle, and thus they generally differ from the avatar's observation angle. Thus, in an embodiment, first, the at least two image frames that are synchronized in time in the at least two image streams are respectively converted into at least two converted image frames adapted to the observation angle associated with the client's corresponding avatar. For example, the image frames 1503 and 1504 in FIG. 15 illustrate this. From FIG. 15, it can be seen that respective converted image frames 1503 and 1502 correspond to the same observation angles (the avatar's observation angles), but in each converted image frame there are pixels lost (as illustrated by the black in the converted image frames 1503 and 1504). In order to obtain a relatively complete play image frame, the converted image frames 1503 and 1504 are synthesized (as illustrated by operation 1505), thereby obtaining a synthesized image frame 1508 for playing. The obtained synthesized image frame 1508 synthesizes the image information included in the converted image frames 1503 and 1504, which makes it more complete. Preferably, to compensate for a few lost pixels existing in the synthesized image frame, other image processing technologies can be employed so as to obtain a more complete play image frame.

It should be noted that a technology for generating an image of a third observation angle based on two different observation angles is known, and it is generally called generation of a virtual view. Further details are not provided here.

Figure 16:
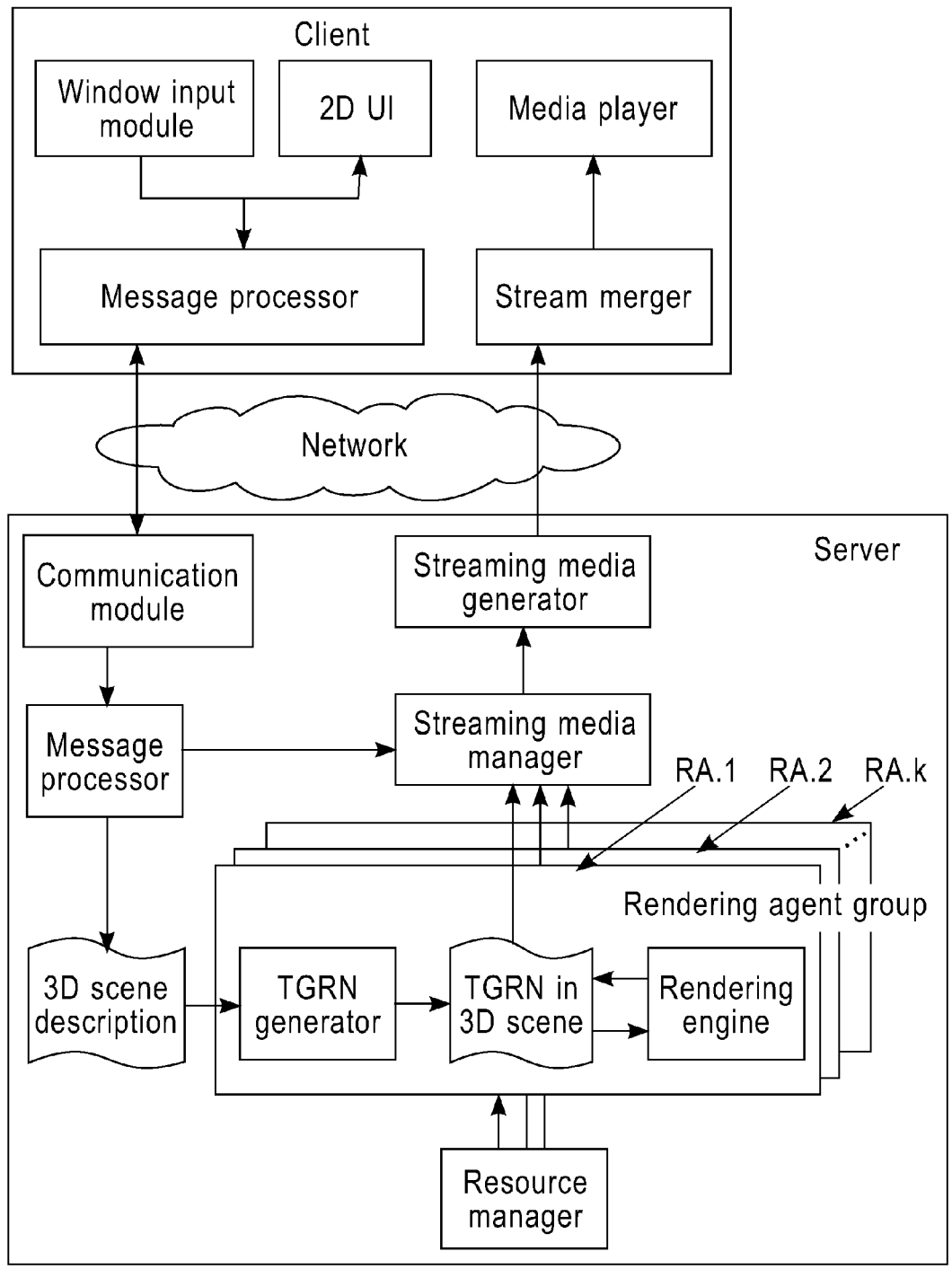
FIG. 16 schematically illustrates a block diagram of a system architecture for implementing a virtual world according to an exemplary implementation of the present invention.

FIG. 16 schematically shows a block diagram of system architecture of implementing a virtual world according to an exemplary embodiment of the present invention. This system architecture includes clients and a server, which communicate with one another through a network, such as an Internet or telecommunication network.

As illustrated in FIG. 16, the client includes a Window input module, a 2D user interface (UI), a message processor, a media player, and a stream merger. The window input module receives an input from the user, such as a command for controlling the avatar and relevant data. The 2D UI displays an image of a virtual world scene played by a media player for the user. The message processor receives a message from the window input module. Sending occurs between the message processor and the server through the network, including processing of a message from the server to display on the 2D UI. The stream merger is for merging at least two streaming media from the server. The media player is for decoding the streaming media so as to play a virtual world scene image on the 2D UI.

As illustrated in FIG. 16, the server includes a communication module, a message processor, a resource manager, a rendering agent group, a streaming media manager, and a streaming media generator. The rendering agent group includes a k number of rendering agents (RA.1 to RA.k). The server further includes a data structure for storing relevant data, for example a 3D scene description and the TGRN of the 3D scene (set in a corresponding rendering agent). A communication module is responsible for processing communication at the network layer, receiving commands and data from the client, and sending necessary commands and data to the client. The message processor is responsible for processing commands and data sent from the client, and different commands can be processed by different message processors.

For a command of changing the 3D scene, for example, creating, modifying deleting an object, and creating, moving, and making an avatar exit, etc., the message processor will update the 3D scene data based on the program logic. When the avatar is moving, a corresponding message processor will notify the streaming media manager to select a video stream to send to the client. The resource manager is for managing documents such as an object model and texture, etc. A 3D scene description is a data structure, which is a global description on the 3D scene data, which includes metadata of all objects in the scene. The metadata includes reference to documents such as object model, texture, etc. The server can include a plurality of rendering agents, each rendering agent including two main functional modules, i.e., rendering engine, and TGRN generator. A TGRN generator can be implemented as an independent thread, and during the system initialization process, it obtains a 3D model data from resource management based on metadata in the 3D scene description, and generates a TGRN network of an original 3D scene therefrom. However, during the running time, the TGRN generator checks in real time whether the 3D scene description is updated; and if so, the TGRN of the 3D scene is correspondingly updated. The rendering engine can also be an independent thread. It can render, based on a TGRN network of the 3D scene, each node therein in real time, and record the rendering result on a corresponding node of the TGRN network of the 3D scene. The streaming media manager dynamically selects a suitable rendering agent and a suitable TGRN node based on the observation angle and location of the avatar, and clips the corresponding rendering result; then a streaming media format supported by the client is generated through a streaming media generator, and finally the video stream is provided to the client.

It should be noted that the system architecture as illustrated in FIG. 16 is only exemplary, and various embodiments of this invention are not limited thereto. In actual application, various modifications can be made as required. For example, a rendering agent group can be implemented on a server or on a plurality of servers, and the streaming media manager and streaming media generator can also be implemented on a separate server. Additionally, when a rendering agent group is implemented on a plurality of servers, it will be advantageous for each rendering agent to includes a 3D scene description corresponding to its location and observation angle, because when a scene changes, it is possible to send a simple message to notify the corresponding server to update the scene data. This can be accomplished without transferring a huge quantity of scene data in real time, which therefore, reduces the amount of data required to transfer.

Figure 17B:
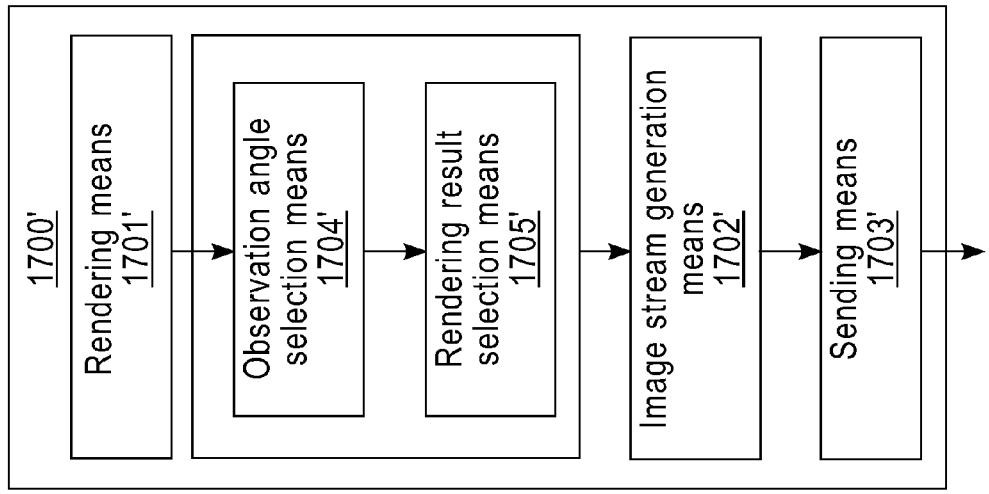
FIGS. 17A and 17B schematically illustrate a block diagram of a system for providing an image of a virtual world scene according to two embodiments of the present invention.
Figure 17A:
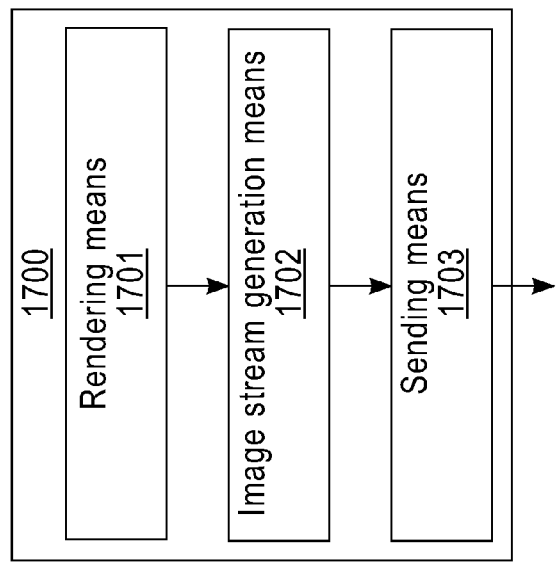

FIGS. 17A and 17B illustrate an system for providing an image of a virtual world scene according to two embodiments of the present invention. As illustrated in FIG. 17A, in an embodiment, a system 1700 includes: rendering means 1701 for rendering a scene of the virtual world to generate a plurality of rendering results; image stream generation means 1702 for generating an image stream based on at least a part of the rendering results; and sending means 1703 for sending the image stream to a client.

In another embodiment, the rendering means 1701 is configured to render, in the virtual world, the virtual world scene from the location and observation angle of a client's corresponding avatar so as to generate the rendering result.

As illustrated in FIG. 17B, in another embodiment, the system 1700' includes rendering means 1701' configured to render, in the virtual world, the virtual world scene from at least one fixed observation angle so as to generate the plurality of rendering results; image stream generation means 1702', for generating an image stream based on at least a part of the rendering results; and sending means 1703' for sending the image stream to the client.

In an embodiment of the present invention, the at least one fixed observation angle includes a plurality of fixed observation angles that are preset to be directed toward the scene from a plurality of points distributed in a peripheral space of the scene.

In a another embodiment, the system 1700' further includes observation angle selection means 1704' for selecting at least one fixed observation angle which best approximates the observation angle associated with the client's corresponding avatar, so as to take the rendering results generated from the at least one fixed observation angle as the part of rendering results.

In another embodiment, the rendering means 1701' is further configured to render the scene at different projection depths; and the system 1700' further includes rendering result selection means 1704' for selecting, based on the location of the corresponding avatar in the virtual world, rendering results whose projection depths correspond to the location as the part of rendering results.

In another embodiment, the rendering means 1701' is further configured to render to scene changes corresponding to the different projection depths.

Figure 18B:
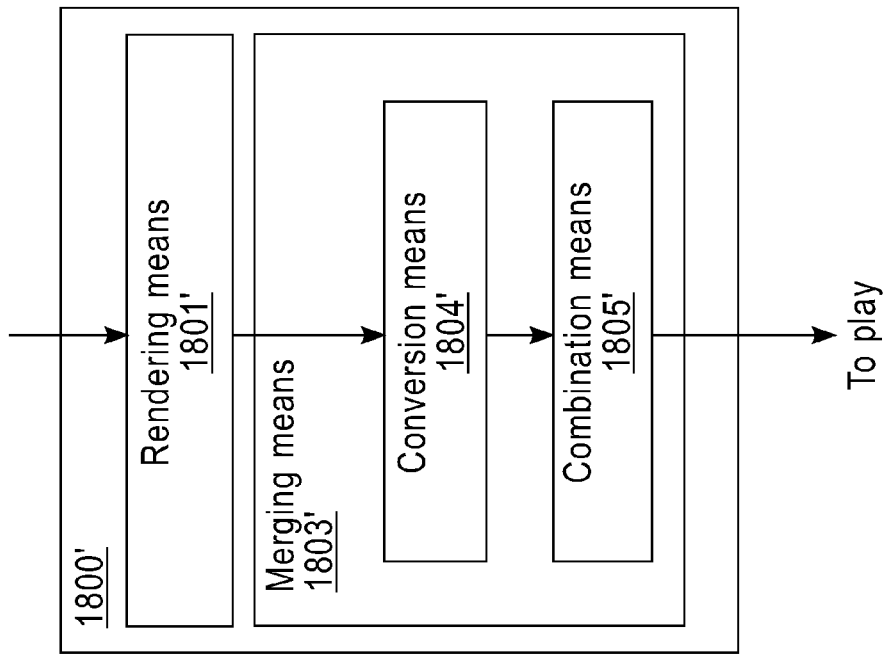
FIG. 18B schematically illustrates a block diagram of a system for processing an image of a virtual world scene according to an embodiment of the present invention.
Figure 18A:
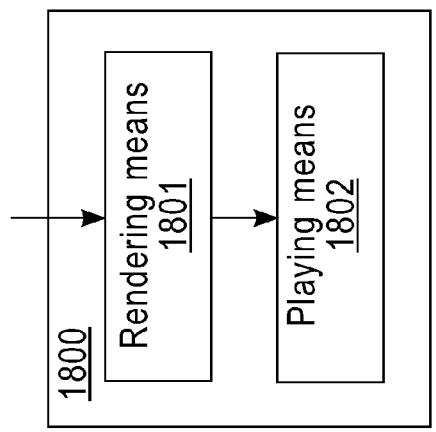
FIG. 18A schematically illustrates a block diagram of a system for displaying an image of a virtual world scene according to an embodiment of the present invention.

FIG. 18A illustrates a block diagram of an system for displaying an image of a virtual world scene according to an embodiment of the present invention. As illustrated in FIG. 18A, in an embodiment, the system 1800 includes receiving means 1801, for receiving an image stream of the virtual world scene at the client, and playing means 1802 for playing the image stream.

FIG. 18B illustrates a block diagram of as system for processing an image of a virtual world scene according to an embodiment of the present invention. As illustrated in FIG. 18B, this system 1801' includes: receiving means 1801' for receiving at least two image streams of the virtual world scene at a client, and merging means 1803' for merging the at least two image streams into a single image stream for playing. Additionally, this system can further include playing means for playing the image stream.

In an embodiment, the merging system 1803' includes: conversion means 1804' for converting at least two image frames that are synchronized with the at least two image streams in time; the at least two converted image frames are adapted to the observation angles of the client's corresponding avatar in the virtual world; and combination means 1805' for combining the at least two converted image frames into a play image stream in the single image stream. The above at least two image streams are generated in the virtual world based on a plurality of rendering results obtained by rendering the scene of the virtual world from at least one fixed observation angle.

In an embodiment of the present invention, there is further provided a system for implementing a virtual world, the system including: any one of the above systems 1700 and 1700' for providing an image of a scene of a virtual world, and the above system 1800 for displaying an image of a virtual world scene of the system 1800' for processing an image of a virtual world scene.

For detailed operations of the above systems 1700, 1700' for providing an image of a virtual world scene, the system 1800 for displaying an image of a virtual world scene, an system 1800' for processing an image of a virtual world scene, and various components in the system for implementing the virtual world, please refer to the specific descriptions on the above method for providing an image of a scene of a virtual world, the above method for displaying an image of a scene of a virtual world, the above method for processing an image of a scene of a virtual world, and the above system architecture for implementing a virtual world in conjunction with FIGS. 2 to 18.

Figure 19:
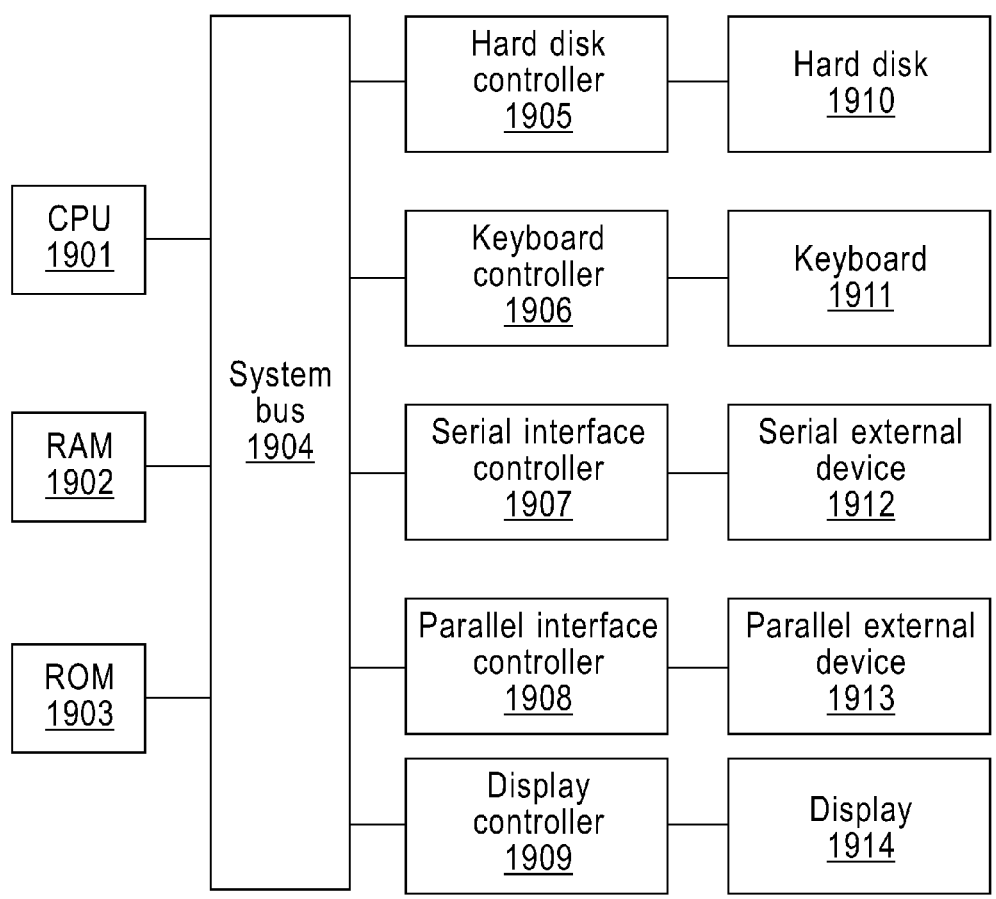
FIG. 19 schematically illustrates a structural block diagram of a computer device capable of implementing the embodiments according to the present invention.

FIG. 19 illustrates a structural block diagram of a computer device that can implement embodiments according to the present invention. As illustrated in FIG. 19, the computer system includes a CPU (Central Processing Unit) 1901, a RAM (Random Access Memory) 1902, a ROM (Read Only Memory) 1903, a system bus 1904, a hard disk controller 1905, a keyboard controller 1906, a serial interface controller 1907, a parallel interface controller 1908, a display controller 1909, a hard disk 1910, a keyboard 1911, a serial peripheral device 1912, a parallel peripheral device 1913 and a display monitor 1914. Among these components, connected to the system bus 1904 are the CPU 1901, the RAM 1902, the ROM 1903, the hard disk controller 1905, the keyboard controller 1906, the serial interface controller 1907, the parallel controller 1908 and the display controller 1909. The hard disk 1910 is connected to the hard disk controller 1905; the keyboard 1911 is connected to the keyboard controller 1906; the serial peripheral device 1912 is connected to the serial interface controller 1907; the parallel peripheral device 1913 is connected to the parallel interface controller 1908; and the monitor 1914 is connected to the monitor controller 1909. The structural block diagram in FIG. 19 is provided only for illustration purposes, and it is not intended to limit the invention. In some cases, some devices can be added or reduced as required.

The present invention can adopt the form of an embodiment including fully hardware, fully software, or an embodiment including both hardware components and software components.

In a preferred embodiment, the present invention is implemented as software, including, without limitation, firmware, resident software, micro-code, etc. Moreover, the present invention can take a form of a computer program product accessible by computer-usable or computer-readable media which provides program code for use by or in connection with a computer or any instruction executing system. For the purpose of description, a computer-usable or computer-readable medium can be any tangible means that can contain, store, communicate, propagate, or transmit the program for use by or in connection with an instruction execution system, system, or device. Examples of the computer-readable medium can include: a semiconductor or solid storage device, a magnetic tape, a portable computer diskette, a random access memory (RAM), a read-only memory (ROM), a hard disk, and an optical disk. Examples of current optical disks include a compact disk read-only memory (CD-ROM), a compact disk-read/write (CD-R), and a DVD.

A data processing system adapted for storing or executing program code can include at least one processor that is coupled to a memory element directly, or via a system bus. The memory element can include a local memory and a mass memory, usable during execution of the program code, and a cache that provides temporary storage for at least one portion of program code so as to decrease the number of times for retrieving code from the mass memory during execution.

An Input/Output or I/O device (including, without limitation to, a keyboard, a display, a pointing device, etc.) can be coupled to the system directly or via an intermediate I/O controller.

A network adapter can also be coupled to the system such that the data processing system can be coupled to other data processing systems, remote printers or storage devices via an intermediate private or public network. A modem, a cable modem, and an Ethernet card are merely examples of a currently usable network adapter.

It is to be understood from the foregoing description that modifications, alterations and combinations can be made to the respective embodiments of the present invention without departing from the true spirit of the present invention. The description in the present specification is intended to be illustrative and not limiting.

We claim:

1. A method, with a computer device, of providing images of a scene in a virtual world, comprising:
   rendering the scene as viewed from a location and observation angle corresponding to a client's avatar in the virtual world to generate a plurality of rendering results, wherein the location of the client's avatar is not included in the scene, and wherein the rendering comprises:
      identifying at least one fixed observation angle associated with a client's avatar in the virtual world;
      determining that at least one fixed observation angle is associated with a plurality of scene depths, wherein each of the plurality of scene depths comprises a set of objects;
      rendering each of the plurality of scene depths and the set of objects within each of the plurality of scene depths, wherein, for a current scene depth in the plurality of scene depths, the rendering comprises generating at least one image comprising the set of objects in the current scene depth and at least a portion of each object in the set of objects for each subsequent scene depth in the plurality of scene depths as observed from the current scene depth, and wherein objects in a previously rendered scene depth are removed from the set of objects in a subsequently rendered scene depth,
      wherein the plurality of rendering results comprises the at least one image that has been generated for each of the plurality of scene depths;
   generating at least one image stream based on at least a part of the plurality of rendering results; and
   sending the at least one image stream from the computer device to a client, wherein the at least one image stream comprises the scene in a pre-rendered form, and wherein the pre-rendered form is configured to present the scene to the client without rendering of the scene by the client.

2. The method according to claim 1, wherein the at least one fixed observation angle comprises a plurality of fixed observation angles, and the plurality of fixed observation angles is preset to be directed toward the scene from a plurality of points distributed in a peripheral space of the scene.

3. The method according to claim 2, further comprising:
   selecting, from the plurality of fixed observation angles, at least one fixed observation angle that best approximates the observation angle associated with the client's avatar; and
   including rendering results generated from the at least one fixed observation angle as part of the plurality of rendering results.

4. The method according to claim 2, wherein the method further comprises:
   selecting a second rendering result from the plurality of rendering results as the part of the rendering results, wherein the second rendering result is based on the location of a client's avatar in the virtual world and has projection depth according to the location.

5. The method according to claim 1, wherein the rendering further comprises:
  rendering changes in the scene corresponding to each of the plurality of scene depths.

6. The method according to claim 1, further comprising generating at least two image streams; and
  merging the at least two image streams into a single image stream for playing.

7. The method according to claim 6, wherein the merging further comprises:
  synchronizing the at least two image streams in time;
  converting at least two image frames of the at least two image streams into at least two converted image frames adapted to an observation angle of the client's avatar; and
  combining the at least two converted image frames into a play image frame in the single image stream.

8. The method according to claim 6, wherein the at least two image streams are generated based in part on the plurality of rendering results.

9. The method of claim 1, wherein the plurality of rendering results does not include a rendering of the client's avatar.

10. A system for providing images of a scene in a virtual world, comprising:
  rendering means for rendering the scene as viewed from a location and observation angle corresponding to a client's avatar in the virtual world to generate a plurality of rendering results;
  wherein the rendering comprises:
    identifying at least one fixed observation angle associated with a client's avatar in the virtual world;
    determining that at least one fixed observation angle is associated with a plurality of scene depths, wherein each of the plurality of scene depths comprises a set of objects;
    rendering each of the plurality of scene depths and the set of objects within each of the plurality of scene depths, wherein, for a current scene depth in the plurality of scene depths, the rendering comprises generating at least one image comprising the set of objects in the current scene depth and at least a portion of each object in the set of objects for each subsequent scene depth in the plurality of scene depths as observed from the current scene depth, wherein objects in a previously rendered scene depth are removed from the set of objects in a subsequently rendered scene depth, and
    wherein the plurality of rendering results comprises each of the plurality of scene depths that have been rendered and the set of objects within each of the plurality of scene depths;
  image stream generation means for generating at least one image stream based on at least a part of the rendering results; and
  sending means for sending the at least one image stream from a server to a client, wherein the at least one image stream comprises the scene in a pre-rendered form, and wherein the pre-rendered form is configured to present the scene to the client without rendering of the scene by the client.

11. The system according to claim 10, wherein the at least one fixed observation angle comprises a plurality of fixed observation angles, and the plurality of fixed observation angles are preset to be directed toward the scene from a plurality of points distributed in a peripheral space of the scene.

12. The system according to claim 10, further comprising:
  observation angle selection means for
    selecting, from a plurality of fixed observation angles, at least one fixed observation angle that best approximates the observation angle of the client's avatar; and
    including rendering results generated from the at least one fixed observation angle as part of the plurality of rendering results.

13. The system according to claim 10, wherein the system further comprises:
  rendering result selection means for selecting a second rendering result from the plurality of rendering results, wherein the second rendering result is based on the location of the client's avatar in the virtual world and has projection depth according to the location.

14. The system of claim 10, wherein the location of the client's avatar is not included in the scene, and wherein the plurality of rendering results consists of only a rendering of the scene and not at all a rendering of the client's avatar.

15. A system including at least one server for processing images of a virtual world, comprising:
  rendering means, at the at least one server, for rendering the virtual world as viewed from a location and an observation angle corresponding to a client's avatar in the virtual world to generate a plurality of rendering results, and wherein the rendering comprises:
    identifying at least one fixed observation angle associated with a client's avatar in the virtual world;
    determining that at least one fixed observation angle is associated with a plurality of scene depths, wherein each of the plurality of scene depths comprises a set of objects;
    rendering each of the plurality of scene depths and the set of objects within each of the plurality of scene depths, wherein, for a current scene depth in the plurality of scene depths, the rendering comprises generating at least one image comprising the set of objects in the current scene depth and at least a portion of each object in the set of objects for each subsequent scene depth in the plurality of scene depths as observed from the current scene depth, wherein objects in a previously rendered scene depth are removed from the set of objects in a subsequently rendered scene depth,
    wherein the plurality of rendering results comprises each of the plurality of scene depths that have been rendered and the set of objects within each of the plurality of scene depths;
  image stream generation means for generating at least two images streams based on at least two of the plurality of scene depths that have been rendered; and
  sending means for sending the at least two image streams to a client, wherein the at least two image streams comprise a scene from the virtual world in a pre-rendered form, and wherein the pre-rendered form is configured to present the scene to the client without rendering of the scene by the client.

16. The system according to claim 15, further comprising at least one client, wherein the at least one client comprises:
  receiving means for receiving the at least two image streams; and
  merging means for merging the at least two image streams into a single image stream for playing,
  wherein each of the at least two image streams includes at least one image frame, and wherein the merging means comprises:

conversion means for converting at least one image frame from each of the at least two image streams that are synchronized in time into respective at least two converted image frames adapted to the observation angle of the client's avatar in the virtual world; and combination means for combining the at least two converted image frames into a play image frame in the single image stream.

17. The system of claim 16, wherein the combination means includes:

synthesizing means for synthesizing two image frames of the at least two converted image frames to obtain a single synthesized image frame for playing.

18. The system of claim 15, wherein the client's avatar is not included in the rendering results.

19. A non-transitory computer readable storage medium tangibly embodying a computer readable program code having computer readable instructions which, when implemented, cause a computer to carry out the method of claim 1.

* * * * *